United States Patent
Bogard

[19]

[11] Patent Number: 5,857,729
[45] Date of Patent: Jan. 12, 1999

[54] PICK-UP TRUCK COVER

[76] Inventor: Donald E. Bogard, 22204 Dolphin Ct., Dearborn Heights, Mich. 48127

[21] Appl. No.: 822,214

[22] Filed: Mar. 21, 1997

[51] Int. Cl.$^6$ .................................................. B60P 7/08
[52] U.S. Cl. ........................ 296/100.09; 296/100.02; 296/100.07
[58] Field of Search ................... 296/100.02, 100.06, 296/100.07, 100.09, 191

[56] References Cited

U.S. PATENT DOCUMENTS

| 3,420,570 | 1/1969 | Kunz | 296/100.06 |
| 3,866,972 | 2/1975 | Reese | 296/100.07 |
| 4,861,092 | 8/1989 | Bogard | 296/100.09 |
| 5,183,309 | 2/1993 | Jordan | 296/100.07 |
| 5,636,893 | 6/1997 | Wheatley et al. | 296/100.07 |

Primary Examiner—Gary C. Hoge
Attorney, Agent, or Firm—Alex Rhodes

[57] ABSTRACT

A lockable, light-weight pick-up truck tonneau cover comprised of a pair of pivotally connected panels which are rotatable about a common transverse axis. A distinguishing feature of the cover is that the panels generally consist of a continuous wall with narrow transverse depressions in top and bottom portions of the wall. The depressions divide the panels into a pluality of transverse cells which extend substantially across the widths of the panels. The panels are attached to the pick-up truck with a pair of slotted brackets which engage short inward extending mounting posts which are attached to the cargo box. At the four outer corners of the cover are hand operated latches for selectively retaining the panels in covering relationship to the cargo box. Adjacent to two of latches are key operated locks for selectively preventing releases of the adjacent latches. A secondary latch mounted to the underside of the rear panel restricts opening of the panel to a small amount when the panel is acted upon by aerodynamic forces and the panel's latch is inadvertently not engaged. A catch mounted on the truck's tailgate prevents opening of the tailgate when the rear panel is closed.

16 Claims, 8 Drawing Sheets

PICK-UP TRUCK COVER

FIELD OF THE INVENTION

This invention relates to pick-up truck covers and more particularly to a lockable, light-weight, tonneau cover for enclosing a cargo box of a pick-up truck.

BACKGROUND OF THE INVENTION

An undesirable feature of pick-up trucks is their open cargo boxes at the rear of the trucks. Although cargo box covers offer numerous benefits to businesses, homeowners, tradesmen, campers, hunters and the like, the majority of pick-up trucks are operated without tonneau covers. Open cargo boxes accelerate vehicle corrosion and expose articles to theft, weathering and vandalism.

Many pick-up truck owners are deterred from purchasing covers because of dissatisfaction with cost, appearance, utility, and/or installation and removal.

SUMMARY OF THE INVENTION

The present invention is an attractive, cost-effective, light-weight, lockable, easy to install cover for a cargo box of a pick-up truck. The invention resides in features which individually and in combination reduce cost, reduce weight, reduce complexity, improve safety and simplify removal and installation of a pick-up truck cover. A still further benefit is improved safety.

The cover is comprised of a pair of molded, pivotally connected, rectangular plastic panels. A distinguishing feature of the invention is that the panels are generally comprised of continuous wall structures having narrow, transverse depressions in top and bottom portions which divide the panels into a plurality of transverse cells. The cells reduce panel distortion, increase panel strength and reduce weight. The elongated depressions also improve appearance by masking imperfections on the exterior of the cover. The panels are mounted on the pick-up truck by slotted brackets which engage short cylindrical posts which extend inwardly into the cargo box. Another feature of the invention is that the molded panels are identical. This feature substantially reduces tooling costs. Another feature is that the hinges which pivotally connect the panels are integral portions of the panels. Another benefit of the invention is that a minimum of tools are required to assemble and install the cover.

At the four outer corners of the cover are hand operated latches which cooperate when engaged retain the cover in a closed, covering relationship with the cargo box. Adjacent to two of the latches are key-operated locks which when engaged prevent releases of the adjacent latches. On the underside of the rear panel there is a secondary latch which automatically restricts an upward movement of the rear panel to a small amount when aerodynamic forces act on the panel and the rear latches are not engaged. A catch on the tailgate of the truck engages the rear panel when the panel is closed to prevent opening of the tailgate. Prop rods are provided on the panels to retain the panels in partially open positions.

Further features and benefits will become apparent by reference to the drawings and ensuing detailed description of a preferred embodiment which discloses a best mode contemplated in carrying out the invention. The exclusive rights which are claimed are set forth in each of the numbered claims following the detailed description of the preferred embodiment.

DETAILED DESCRIPTION OF THE PREFERRED EMBODIMENT

Referring now to the drawings wherein like numerals designate like and corresponding parts throughout the several views, in FIGS. 1 through 27, inclusive, a tonneau cover 30 is shown according to my invention. In FIGS. 1 through 4, the cover 30 is mounted on a conventional pick-up truck 31. The pick-up truck 31 is comprised of a cab 32 and a cargo box 33 mounted on a chassis behind the cab 32. The cargo box 33 is comprised of a horizontal floor 34 and a vertical wall structure 35 which cooperate to form cooperate to form a cargo space 36 for transporting cargo. The vertical wall structure 35 is comprised of a laterally extending front wall 37, adjoining spaced apart side walls 38 and a tailgate 39 which is movable from a position laterally bounding the cargo space 36 to a position which does not laterally bound the cargo space 36. The top portions of the side walls 38, hereinafter referred to as rails 40, are existing inverted channel portions which reinforce the side walls 38 and provide a structure for mounting the cover 30.

The cover 30 is comprised of a pair of juxtaposed, pivotally connected, generally rectangular front 41 and rear 42 panels. The panels 41, 42 are separately rotatable with respect to the cargo box 33 about a common transverse axis 43 of hinge members 50, 51 which connect the panels 41, 42. As used herein, the term front panel refers to the panel adjacent to the cab 32 and the term rear panel refers to the panel 42 farthest from the cab 32.

Figure 1:
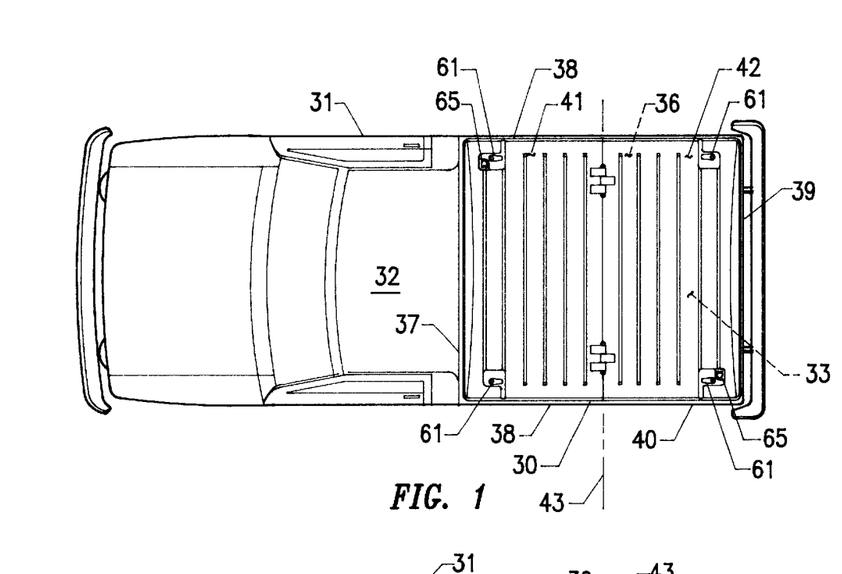
FIG. 1 is a plan view of a pick-up truck and a cover according to the invention.
Figure 2:
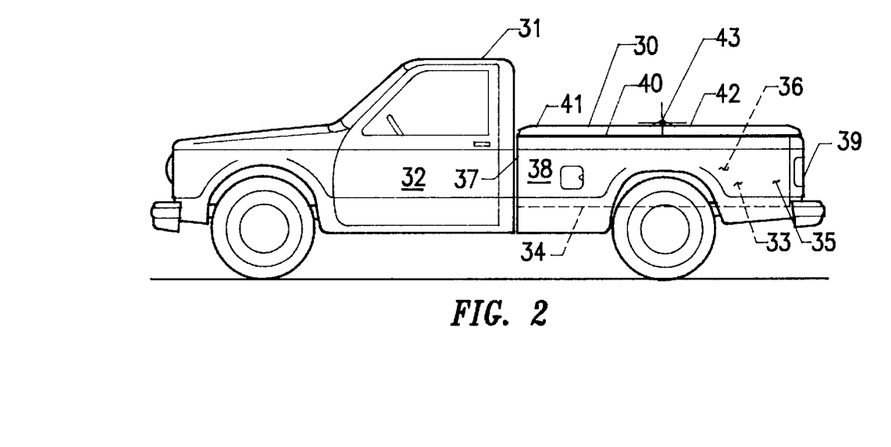
FIG. 2 is a left side elevation view of the pick-up truck and cover.
Figure 3:
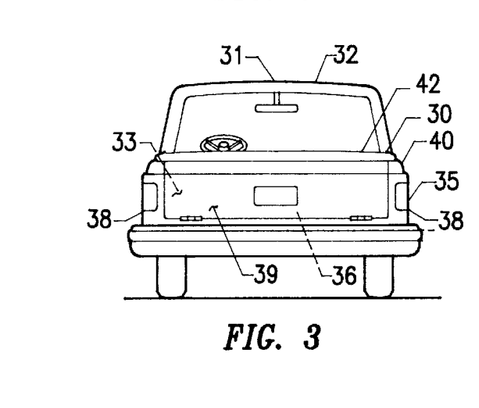
FIG. 3 is a rear elevation view of the pick-up truck and cover.
Figure 4:
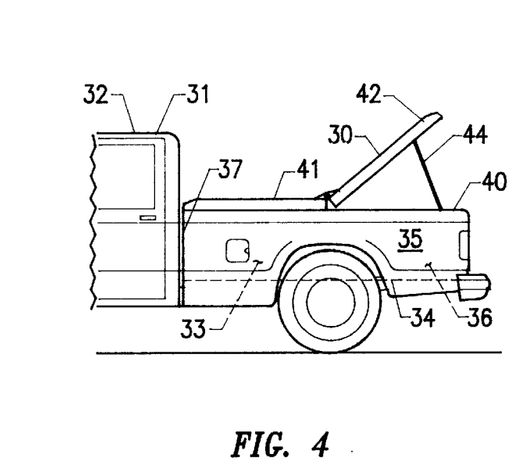
FIG. 4 is a partial left side elevation view of the pick-up truck and cover showing a rear panel in a partially raised position.

In FIGS. 1 through 3, the tonneau cover 30 rests on the tailgate 39 and rails 40 of the cargo box 33 and is in covering relationship to the cargo box 33. In FIG. 4, the rear panel 42 is raised and held in position by a prop rod 44 which extends from the cover 30 to a rail 40 of the cargo box 33.

Figure 7:
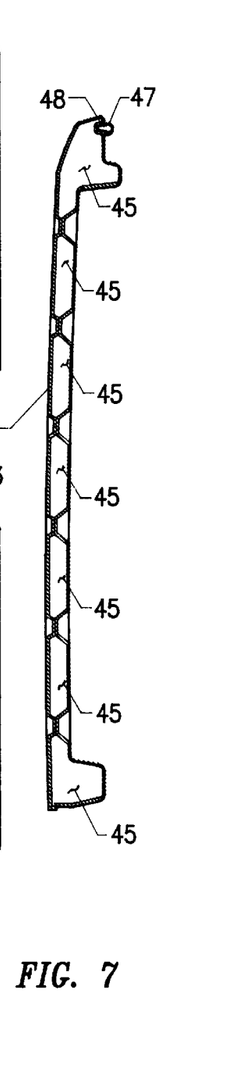
FIG. 7 is an enlarged cross-sectional view taken on the line 7—7 in FIG. 5, showing the cellular structure of the cover.
Figures 8, 9:
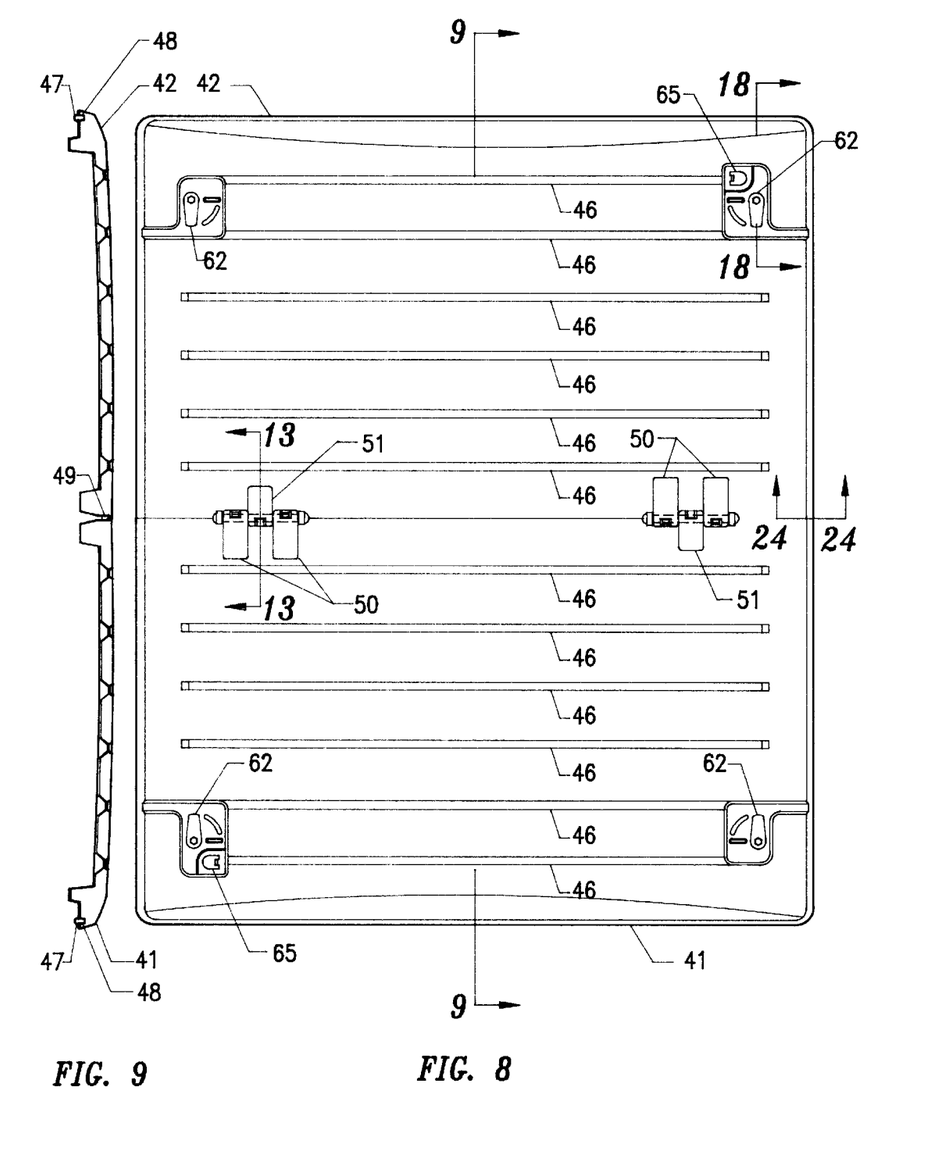
FIG. 8 is an enlarged plan view of the assembled cover.
FIG. 9 is a longitudinal cross-sectional view taken on the line 9—9 in FIG. 8.
Figure 10:
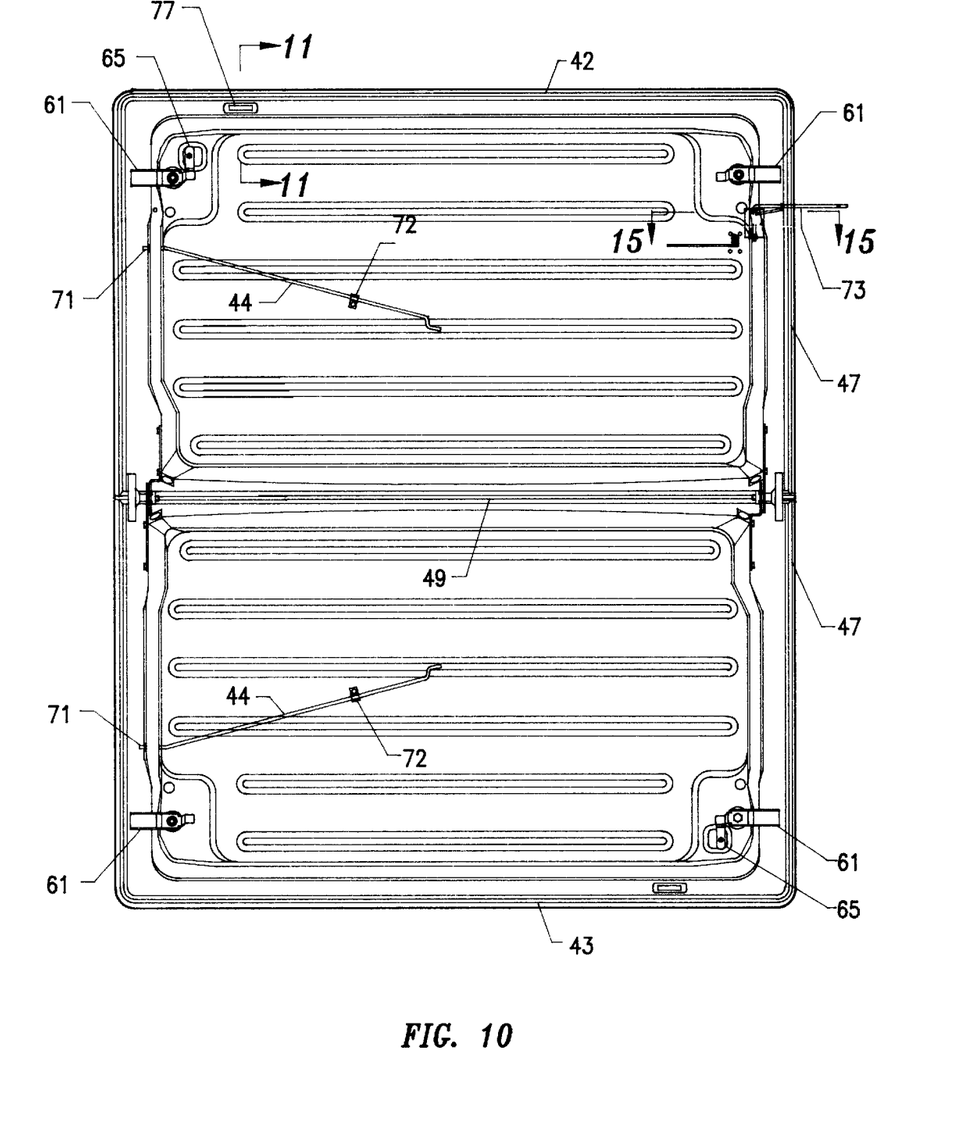
FIG. 10 is an enlarged bottom view of the assembled cover.

The general construction of the front 41 and rear 42 panels can be best understood by reference to FIGS. 5 through 9. FIG. 2 is an exploded plan view of the front 41 and rear 42 panels. FIGS. 8 and 10 are top and bottom views of the assembled cover 30.

The panels 41, 42 are formed by "blow molding" a low cost thermoplastic polymer, such as polypropylene. Blow molding provides a structure having a generally uniform wall thickness and reduces cost, part complexity and weight. One distinguishing characteristic of the blow molded panels 41, 42 is that narrow elongated depressions 46 in top and bottom portions of the panels 41, 42 divide the panels 41, 42 into transverse cells 45 which extend substantially along the full widths of the panels 41, 42. This feature was developed after a number of failed attempts to reduce distortion, improve appearance and increase structural integrity. Before the cells 45 were incorporated, experimental panels could not be satisfactorily aligned with or sealed with the cargo box 33. They distorted during the blow molding process. Moreover, when objects were placed on the top surfaces of the panels, the panels deflected, giving the cover an appearance of inferior quality. Also appearance was unsatisfactory. After considerable expense, time, failures, and tooling changes, the solution was developed of dividing the panels 41, 42 into cells 45. After the cells 45 were added, panel strength substantially increased, distortion was substantially eliminated and appearance substantially improved.

Another feature of the cover 30 depicted in the drawings is identical molded panels 41, 42. Although identical panels 41, 42 are not essential, they provide important cost reductions in tooling, inventory and handling. Another benefit of the invention is a reduction in effort over covers having single panels during an uncovering of the cargo box 33 because of the lesser weight of the each of the pair of separate panels 41, 42.

Figures 11, 12:
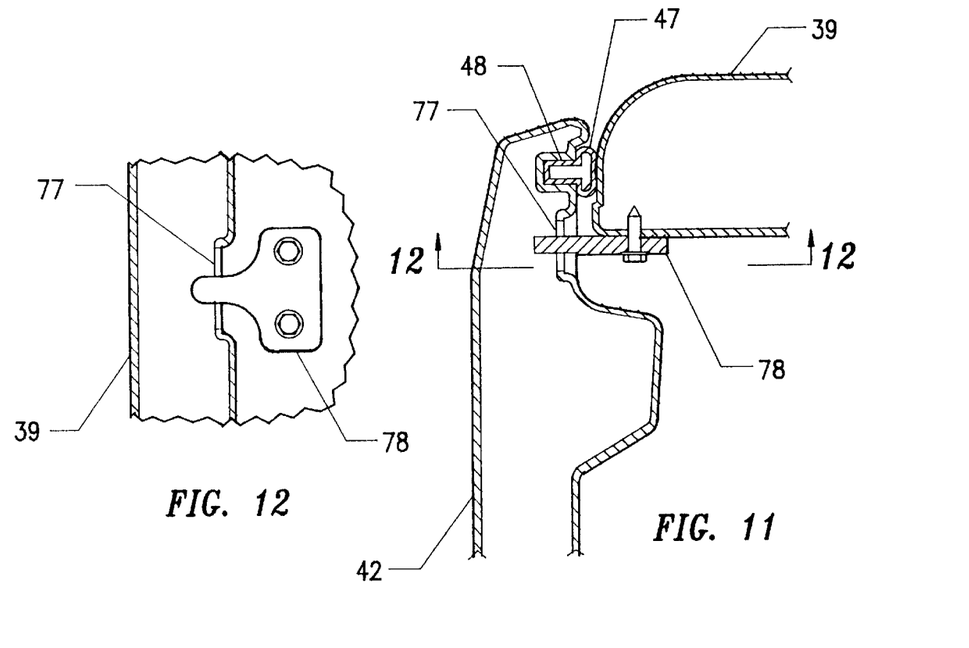
FIG. 11 is an enlarged cross-sectional view taken on the line 11—11 in FIG. 5 showing a catch for locking a tailgate.
FIG. 12 is a cross-sectional view taken on the line 12—12 in FIG. 11.
Figure 13:
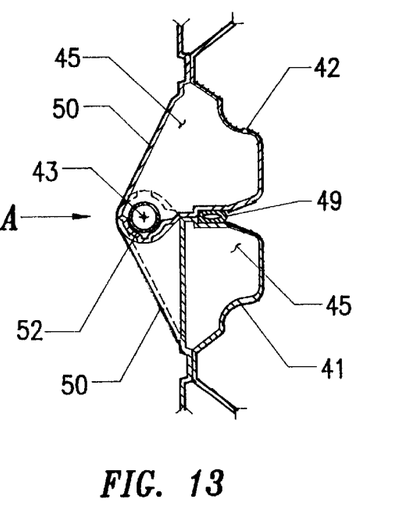
FIG. 13 an enlarged cross-sectional view through a hinge taken on the line 13—13 in FIG. 8.

Referring to FIGS. 7, 10 and 11, around outer edge portions of the panels 41, 42 is a flexible tubular seal 47 held in a groove 48. When the panels 41, 42 are in covering relationship with the cargo box 33, the seal 47 presses against the rails 40 of the cargo box 33 and the tailgate 39. With reference to FIGS. 10 and 13, at the inner boundaries of the covers 41, 42 is a flexible seal 49 which is adhesively bonded to the front panel 41 for sealing a gap between the panels 41 when they are in covering relationship with the cargo box 33.

Figure 5:
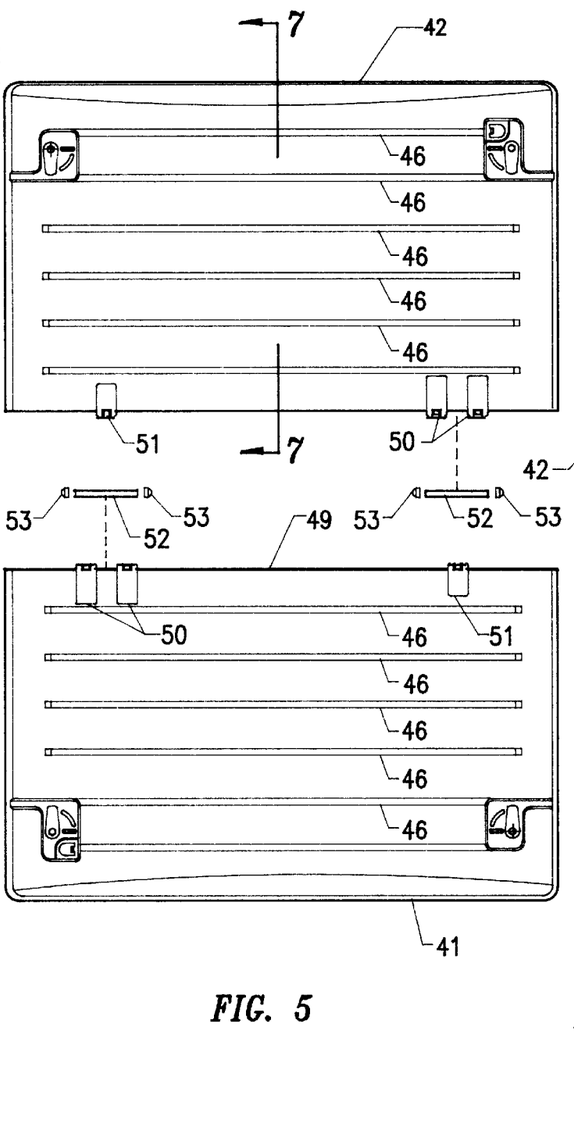
FIG. 5 is an enlarged exploded plan view of the cover showing a pair of panels and a means for pivotally connecting the panels.
Figure 6:
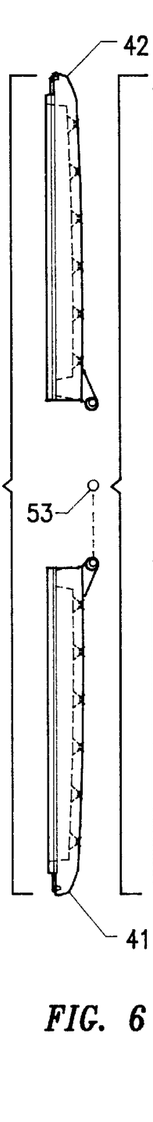
FIG. 6 is a left side view of FIG. 5.
Figure 14:
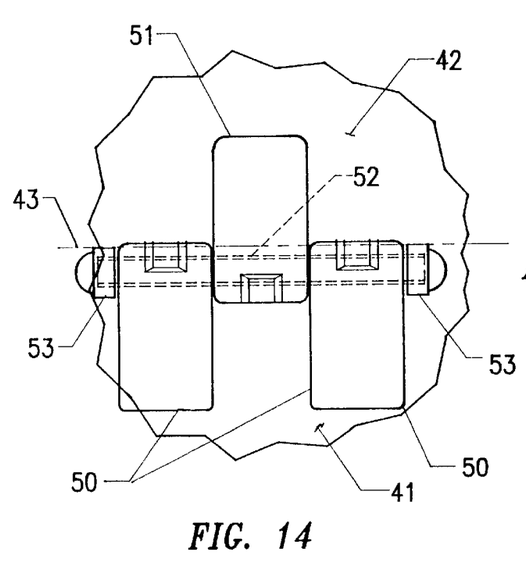
FIG. 14 is a view of the hinge taken in the direction of arrow A in FIG. 13.

With reference to FIGS. 5, 13 an 14, a further feature is the integration of the hinge members 50, 51 which connect the panels 41, 42 with the panels 41, 42. This feature reduces cost, improves panel alignment and improves appearance. Tubular shafts 52 extending through the hinge members 50, 51 are retained in place with "push on" nuts 53 at the ends of the shafts 52.

The means attachment of the cover 30 to the truck 31 is best understood by reference to FIGS. 4 and 24 through 27. The cover 30 is attached to the rails 40 of the cargo box 33 with slotted brackets 54, 55 which engage short cylindrical posts 56. The posts 56 extend inwardly from mounting brackets 57 attached to opposite rails 40 of the cargo box 33. The mounting posts 56 are attached to the brackets 57 with threaded fasteners. The mounting brackets 57 are clamped to the rails 40 with fasteners which extend through the brackets 57 and plates 58 located on opposite sides of inner vertical portions of the rails 40. This style of attachment permits fore and aft adjustments of the mounting posts 56 when it becomes necessary to align the cover 30 with the cargo box 33. It also permits the mounting posts 56 to be used on a variety of pick-up trucks.

Figure 27:
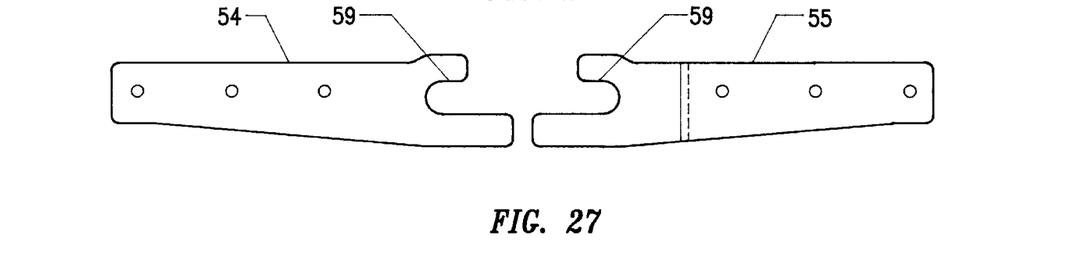
FIG. 27 is an exploded view of the pair of slotted brackets shown in FIG. 25.

Referring now to FIG. 27, open slots 59 are provided in the mounting brackets 54, 55 to simplify an installation or removal of the tonneau cover 39. The open slots 59 permit the cover 30 to be installed or removed without tools by rotating and disengaging the slots 59 of brackets 54, 55 with the mounting posts 56. The brackets 54, 55 are attached to the panels 41, 42 with nuts that engage weld bolts which protrude through the sides of the panels. The weld bolts are attached to reinforcements on the inside of the cover 30.

At the outer corners of the cover 30 are latches 61 for retaining the cover 30 in closed relationship to the cargo box 33. The construction of the latches 61 can be best understood by reference to FIGS. 18 through 21. The latch in FIGS. 18 through 21, is comprised of a rotatable plastic handle 62 which extends through the handle 62, a stamped cam 63 which is keyed to the handle 62 and rotates with the handle 62, and a plastic strike 64 which is attached to the rail 40. The handle 62 is retained in the panel 42 with a bolt which extends through the handle 62 and a nut. The latch cam 63 is attached to an end portion of the bolt with a pair of nuts. The nuts allow the latch cam 63 to be vertically re-positioned for alignment with the strike 64.

Figure 18:
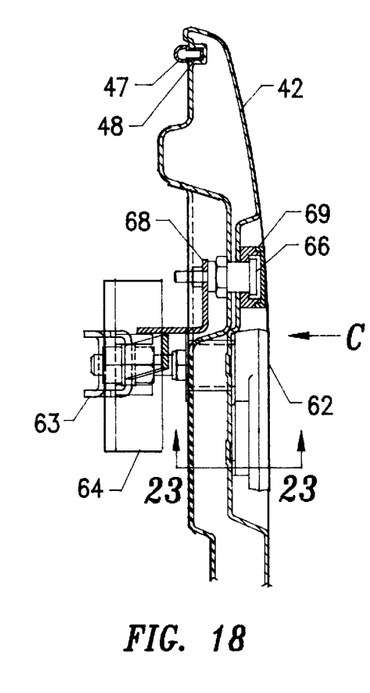
FIG. 18 an enlarged cross-sectional view through a key operated lock, taken on the line 18—18 in FIG. 8.
Figure 19:
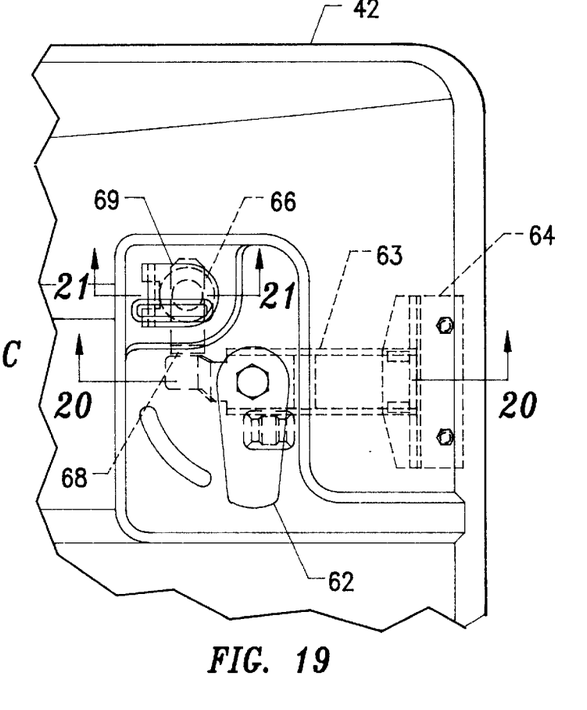
FIG. 19 is a view taken in the direction of arrow C in FIG. 18.
Figures 20, 21, 22, 23:
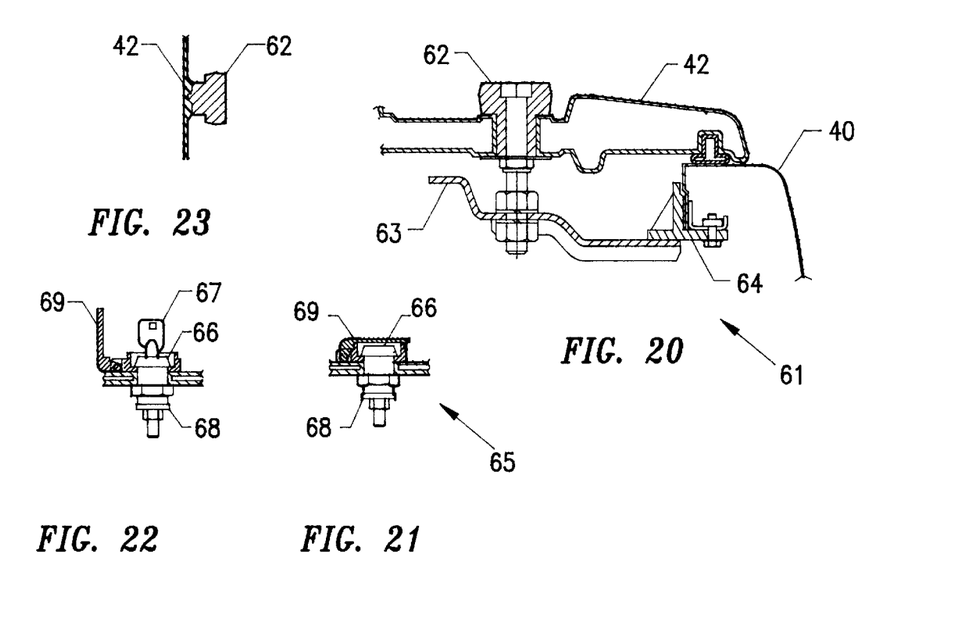
FIG. 20 is a cross-sectional view through a latch taken on the line 20—20 in FIG. 19.
FIG. 21 is a cross-sectional view taken on the line 21—21 in FIG. 19 showing the lock in a covered condition.
FIG. 22 is a cross-sectional view through the key operated lock in an uncovered condition.
FIG. 23 is an enlarged cross-sectional through the latch taken on the line 23—23 in FIG. 18.
Figure 24:
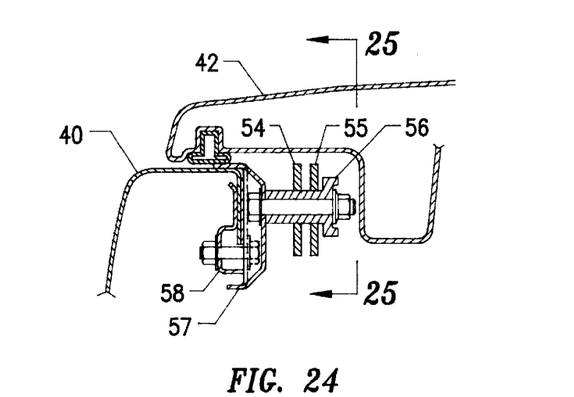
FIG. 24 is an enlarged cross-sectional view through a mounting post taken on the line 24—24 in FIG. 8.
Figure 25:
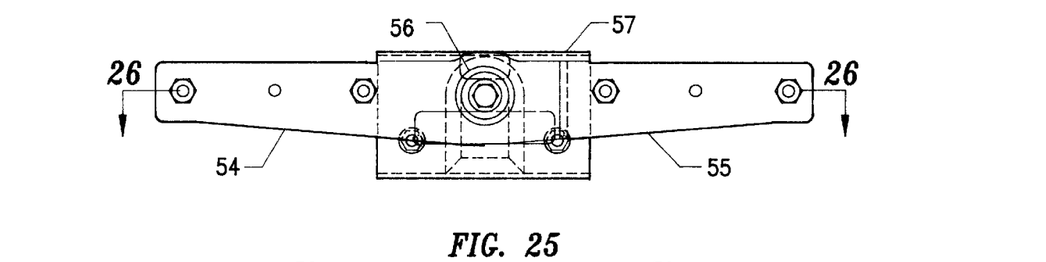
FIG. 25 is a cross-sectional view taken on the line 25—25 in FIG. 24.
Figure 26:
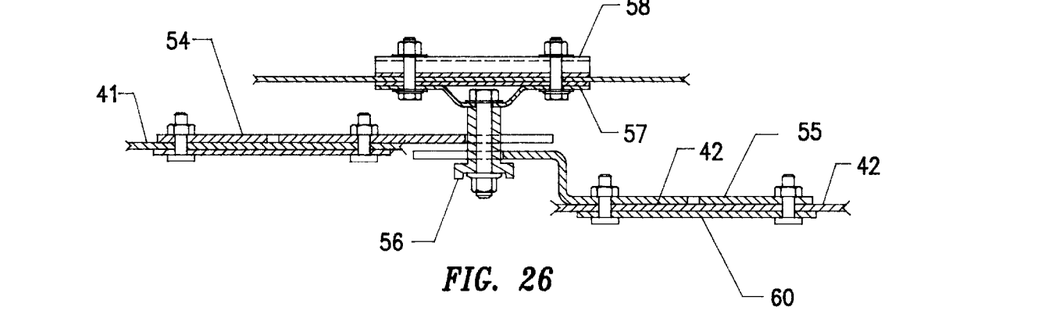
FIG. 26 is a cross-sectional view taken on the line 26—26 in FIG. 25.

In FIGS. 18 through 20, the handle 62 and latch cam 63 are shown in a latched condition whereby an end portion of the latch cam 63 extends under the strike 64 to prevent the panel 42 from being raised. When the handle 62 is rotated 90 degrees clockwise from the latched condition to an unlatched condition, the latch cam 63 clears the strike 64.

With reference to FIGS. 18, 19, 21, and 22, a key operated lock 65 is provided adjacent to a latch 61 for locking the panel 42 to the cargo box 33. The 65 is conventional and is comprised of a cylinder lock 66, a key 67, a stamped cam 68 and a cover 69. The cylinder lock 66 extends though the panel 42 and is retained in the panel 42 with a nut. The cam 68 is attached to an end of the cylinder lock 66 and rotates when the key 67 is rotated to prevent a release of the latch 61. In FIGS. 21 the cover 30 is shown in a closed condition and in FIG. 22 the cover is shown in an open condition.

Referring again to FIG. 4, on the underside of the panels 41, 42, slender cylindrical prop rods 44 are pivotally mounted for supporting the panels 41, 42 in partially open positions. End portions of the prop rods 44 extend through openings in the panels 41, 42 and are retained in the panels 41, 42 with "push on" nuts. When the prop rods 44 are not in use, they are retained to the underside of the panels 41, 42 with clips 72. When the panels are raised, end portions of the prop rods 44 engage the rail 40 to support the panels in partially open positions. In lieu of the prop rods 44, each panel 41, 42 may be rotated 180 degrees and nested against the other panel 41, 42 for transporting large articles or procuring access to the interior of the cargo box 33.

Figure 15:
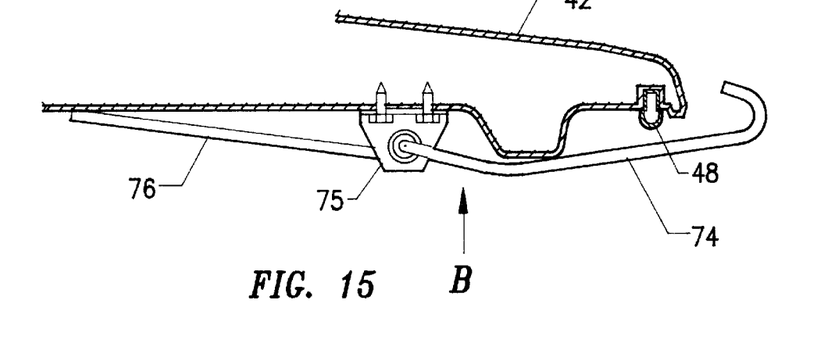
FIG. 15 an enlarged cross-sectional view of a secondary latch taken on the line 15—15 in FIG. 10.
Figure 16:
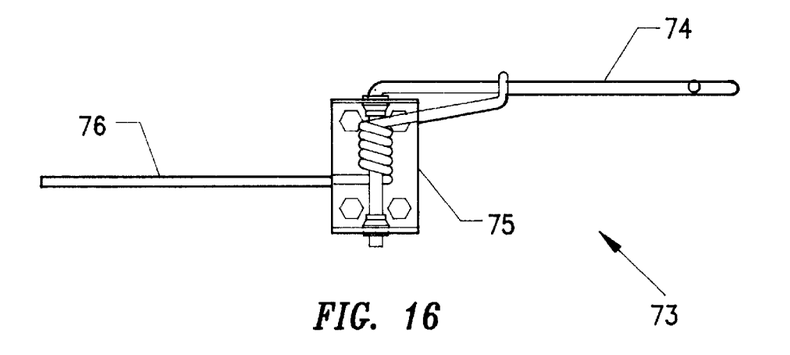
FIG. 16 a bottom view of the secondary latch taken in the direction of arrow B in FIG. 15.
Figure 17:
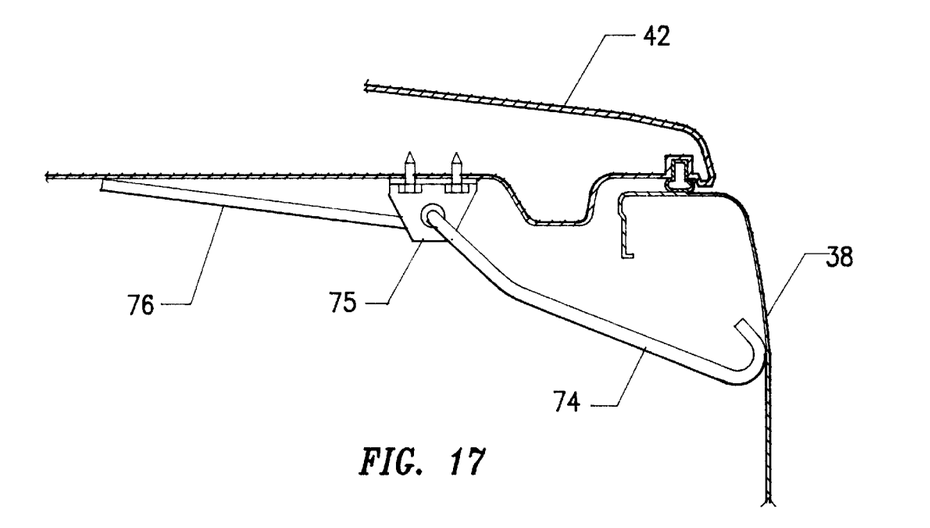
FIG. 17 is a view of the secondary latch in an alternate position.

With reference to FIGS. 4, and 15 through 17, a secondary latch 73 is provided on the underside of the rear panel 42 for preventing aerodynamic forces from lifting the rear panel 42 when the truck 31 is in motion and the latches 61 of the rear panel 42 are inadvertently left open. The secondary latch 73 is comprised of a slender cylindrical hook 74 pivotally mounted in a bracket 75 and a torsion spring 76 which biases the hook 74 in an outward direction. The bracket 75 is a channel shaped member with apertures for attaching the secondary latch 73 to the rear panel. In FIG. 17 the hook 74 is shown when the rear panel 42 is closed, i.e. biased by the torsion spring 76 against the side wall 38 of the cargo box 33. During an opening of the rear panel 42, the hook 74 remains in contact with the side wall 38 until engaging the rail 40 to prevent further opening of the panel 42. To further open the rear panel 42, the hook 74 must be manually rotated to disengage the rail 40. In FIGS. 15 and 16 the hook 74 is shown biased by the torsion spring 76 against the underside of the panel 42 when the rear panel 42 is open. To close the panel 42, the hook 74 must be manually rotated to clear the rail 40.

In FIG. 11 and 12, a means for latching the tailgate 39 is shown which is comprised of a slotted opening 77 in the underside of the rear panel 42 and a stamped catch 78 attached to the tailgate 39. When the rear panel 42 is closed, the catch 78 engages the slotted opening 77 and prevents the tailgate 39 from being opened.

From the foregoing it will be appreciated that my invention provides provide a novel pick-up truck cover having substantial improvement over the prior art, including reductions in weight, cost and complexity. Further, cover installation and removal have been simplified and safety has been improved.

The cover is comprised of a pair of rectangular molded panels, each having a continuous outer wall. The panels have spaced apart upper, lower and side portions and are divided into a is plurality of cells by narrow elongated depressions elongated in the upper and lower portions. The cellular structure is a distinguishing feature of the invention and improves the structural integrity of the cover, reduces distortion during molding and improves appearance.

Although only a single embodiment has been illustrated and described it will be appreciated that other embodiments can be developed by substitutions of parts and/or changes in material, shape and arrangement of parts without departing from the spirit thereof.

I claim:

1. In a pick-up truck having a chassis-mounted cargo box comprising a generally horizontal floor and a generally vertical wall structure cooperating with said floor to form a cargo space which is bounded on the bottom by said floor and laterally by said vertical wall structure, but which is open at the top, said vertical wall structure including a gate which is movable from a position laterally bounding said cargo space to a position which does not laterally bound the cargo space, and a cover cooperating with the open top of the cargo box to selectively cover and uncover said cargo space, the improvement which comprises: said cover comprising at least one relatively rigid, but relatively light-weight generally rectangular panel attached to said vertical wall structure, said panel comprised of spaced apart, upper, lower, side and bottom portions of a substantially continuous wall, said upper and lower portions of said substantially continuous wall having a plurality of narrow elongated depressions which divide said panel into a plurality of cells; a releasable means for attaching said panel to said vertical wall structure; and at least one latch mounted in said panel for retaining said cover in covering relationship to said cargo box.

2. The improvement set forth in claim 1 wherein said latch comprises a handle pivotally mounted in said panel, said handle being selectively rotatable to a latched position and to an unlatched position; a strike attached to said vertical wall structure; and a cam attached in keyed relationship to a bottom portion of said handle; and said cam having an end portion which extends under said strike when said handle is rotated to said latched position for retaining said cover in covering relationship to said cargo box.

3. The improvement set forth in claim 2 further comprising a means for locking said cover in said covering relationship to said cargo box.

4. The improvement set forth in claim 3 wherein said means for locking said cover comprises a key operable cylinder lock mounted in said panel adjacent to said handle; a key for operating said cylinder lock; and a cam mounted on an end position of said cylinder lock for preventing said end portion of said cam which extends under said strike from moving from said position to release said latch.

5. The improvement set forth in claim 1 further comprising a slender prop rod pivotally attached to said lower portion of said cover for supporting said cover in a partially open position.

6. The improvement set forth in claim 1 further comprising a means for preventing said tailgate from moving from said position laterally bounding said cargo space to said position which does not laterally bound the cargo space when said cover in is said covering relationship to said cargo box.

7. The improvement set forth in claim 6 wherein said means for preventing said movement of said tailgate comprises a a catch attached to said tailgate; and a slotted opening in said lower portion of said panel for receiving said catch when said cover is in said covering relationship to said cargo box.

8. The improvement set forth in claim 1 further comprising a secondary latch on the lower portion of said panel for preventing aerodynamic forces from lifting said cover when said truck is in motion and said latch is inadvertently not engaged.

9. The improvement set forth in claim 8 wherein said secondary latch comprises a slender cylindrical hook; a bracket attached to said lower portion of said panel for pivotally mounting said hook; and a torsion spring for biasing said hook in engaged relationship with said wall structure.

10. The improvement set forth in claim 1 wherein said mean for attaching said cover to said vertical wall structure comprises a short cylindrical post attached to said wall structure, said post extending inwardly into said cargo space; and a slotted bracket attached to said side portion of said panel for engaging said post.

11. A cover for enclosing a cargo box of a pick-up truck comprising: at least one pair of pivotally connected relatively rigid, but relatively light-weight rectangular panels, each of said panels comprised of spaced apart, upper, lower, side and bottom portions of a substantially continuous wall and having a plurality of narrow elongated depressions which divide said panel into a plurality of cells; a means for pivotally connecting said panels; and a releasable means for attaching said panels to said pick-up truck.

12. The cover as recited in claim 11 wherein said means for releasably attaching said panels to said pick-up truck comprises a pair of short cylindrical posts attached to opposite sides of said cargo box, said posts extending inwardly into said cargo box; and a pair of slotted brackets attached to opposite sides of said cover for engaging said posts.

13. The cover as recited in claim 11 further comprising at least one latch mounted in each of said panels of said cover for retaining said cover in covering relationship to said cargo box.

14. The cover as recited in claim 13 further comprising a lock mounted in each of said panels adjacent to said latch for locking each of said panels in covering relationship to said cargo box.

15. The cover as recited in claim 12 further comprising a secondary latch for preventing aerodynamic forces from lifting one of said panels when said truck is in motion and said latch of said panel is inadvertently not engaged; said secondary latch comprising: a slender cylindrical hook; a bracket attached to said panel for pivotally mounting said hook; and a torsion spring for biasing said hook in engaged relationship with truck.

16. A cover for enclosing a cargo box of a pick-up truck comprising a relatively rigid, but relatively light-weight generally rectangular panel, said panel having spaced apart, upper, lower, side and bottom portions of a substantially continuous wall, said upper and lower portions having a plurality of narrow elongated transverse depressions which divide said panel into a plurality of transverse cells which extend substantially across the entire width of said panel; and a means for pivotally connecting said panel to said cargo box of said pick-up truck.

* * * * *

UNITED STATES PATENT AND TRADEMARK OFFICE
CERTIFICATE OF CORRECTION

PATENT NO. : 5,857,729
DATED : January 12, 1999
INVENTOR(S) : Donald E. Bogard

It is certified that error appears in the above-identified patent and that said Letters Patent is hereby corrected as shown below:

Column 2, line 48, after "cross-sectional", insert --view--

Column 3, line 60, before "each", delete --the--

Column 4, line 5, after "Figs. 5, 13", change "an" to --and--

Column 4, line 7, delete --with the panels 41,42--

Column 4, line 58, before "65", insert --lock--

Column 5, line 33, change "Fig." to --Figs.--

Column 5, line 40, after "provides", delete --provide--

Column 6, line 41, change "in is" to --is in--

UNITED STATES PATENT AND TRADEMARK OFFICE
CERTIFICATE OF CORRECTION

PATENT NO. : 5,857,729
DATED : January 12, 1999
INVENTOR(S) : Donald E. Bogard

It is certified that error appears in the above-identified patent and that said Letters Patent is hereby corrected as shown below:

Column 6, line 45, before "catch", delete --a--

Column 6, line 61, change "mean", to --means--

Column 8, line 8, before "truck", add --said--

Signed and Sealed this

Twenty-fifth Day of May, 1999

Attest:

Q. TODD DICKINSON

*Attesting Officer*     *Acting Commissioner of Patents and Trademarks*